(12) United States Patent
Kinkaid

(10) Patent No.: US 7,364,406 B2
(45) Date of Patent: Apr. 29, 2008

(54) SEGMENTED VERTICAL AXIS AIR ROTOR AND WIND GENERATOR APPARATUS

(75) Inventor: Christopher P. Kinkaid, Portland, OR (US)

(73) Assignee: Oregon Wind Corporation, Portland, OR (US)

( * ) Notice: Subject to any disclaimer, the term of this patent is extended or adjusted under 35 U.S.C. 154(b) by 79 days.

(21) Appl. No.: 11/134,219

(22) Filed: May 20, 2005

(65) Prior Publication Data
US 2006/0263198 A1 Nov. 23, 2006

(51) Int. Cl.
*F04D 29/60* (2006.01)

(52) U.S. Cl. .................. 416/132 B; 416/243

(58) Field of Classification Search .............. 415/4.2, 415/4.4, 907; 416/132 R, 132 B, 243; 290/44, 290/55
See application file for complete search history.

(56) References Cited

U.S. PATENT DOCUMENTS

| | | | |
|---|---|---|---|
| 1,200,308 A * | 10/1916 | Bunnell | 415/211.1 |
| 4,606,697 A * | 8/1986 | Appel | 415/4.4 |
| 7,008,171 B1 * | 3/2006 | Whitworth | 415/4.2 |
| 7,156,609 B2 * | 1/2007 | Palley | 415/4.2 |

* cited by examiner

*Primary Examiner*—Edward K. Look
*Assistant Examiner*—Devin Hanan
(74) *Attorney, Agent, or Firm*—Kolisch Hartwell, P.C.

(57) ABSTRACT

An apparatus is provided for generating electricity in response to a fluid flow. The apparatus includes a top rotor element coupled to a center axis with an arm extending substantially perpendicular to a center axis. The arm moves in response to the fluid flow to rotate the center axis. The apparatus also includes a bottom rotor element coupled to the center axis also having an arm extending substantially perpendicular to the center axis. The arm of the bottom rotor element is substantially fixed in a position relative to the arm of the top rotor element, wherein the position is offset about the center axis by about 90° from the top rotor element. The apparatus further includes intermediate rotor elements stacked between the top rotor element and the bottom rotor elements, wherein the intermediate rotor elements are in positions successively offset about the center axis in degrees to produce the 90° offset of the bottom rotor element relative to the top rotor element, and each intermediate rotor element includes a tongue and a groove for coupling to the adjacent rotor element. The tongue and groove of each intermediate rotor element are offset from one another to produce the successive offset of the rotor elements.

14 Claims, 22 Drawing Sheets

SEGMENTED VERTICAL AXIS AIR ROTOR AND WIND GENERATOR APPARATUS

This application claims priority under 35 U.S.C. 119(e) to U.S. Provisional Patent Application No. 60/427,457 entitled "SEGEMENTED VERTICAL AXIS ROTOR AND WIND GENERATOR APPARATUS," filed Nov. 20, 2002, and to PCT Patent Application No. PCT/US03/037584 entitled "SEGEMENTED VERTICAL AXIS AIR ROTOR AND WIND GENERATOR APPARATUS", filed Nov. 20, 2003, the disclosure of which is incorp orated herein by reference.

The Segmented Vertical Axis Air Rotor Wind Generator is an apparatus and methodology that increases the utility gained in wind generated power and energy production. Drag-type wind generators are known in the art, although little used in practice due to impractical techniques of configuration, manufacture and deployment. The technology described below provides the means for those skilled in the art to manufacture a drag-type vertical axis wind generator with improved performance and manufacturing utility.

Figure 1:
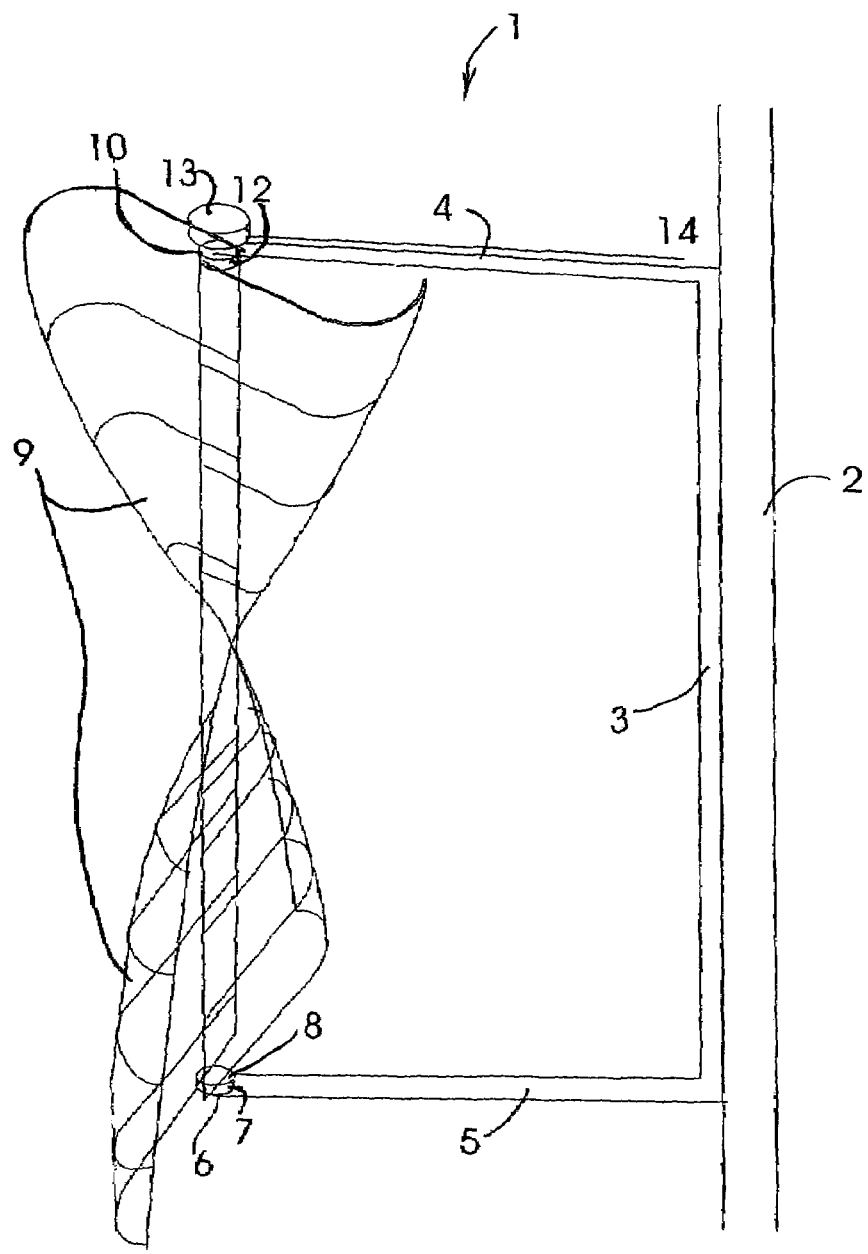

FIG. 1, depicts the specific invention in one of its preferred embodiments. (1) shows a perspective-view of the specific invention which is composed of the following elements. (2) A vertical mounting pole to which a mounting bracket (3) is attached to support the specific invention. Upper support arm (4), and lower support arm (5) extend from the mounting bracket to laterally support the air rotor apparatus. At the end of the bottom support arm (5) furthest away from the pole the bottom support arm (5) houses a seated bearing support (6) and a weight-loading bearing (7). This bearing bears the weight of the rotor assembly above. The rotor assembly is composed of a specific element (8) which is a bottom bracket which attaches to, and is seated in, the weight-loading bearing (7). This bottom bracket (8) is constructed as a co-axial ring that is connected to the bearing and extends two arms that radiate out from either side of the ring in opposite directions. The rotor elements (9) will be supported by this bottom bracket (8), above the rotor assembly is another bearing (12) which is positioned directly over the vertical axis of the lower bearing (7), and is seated in a bearing housing fashioned into the upper support arm (4). The top bracket (10) and the bottom bracket (8) make a 90 degree span of rotation, sandwiching the rotor elements (9) in between through the vertical height of the rotor.

The rotor elements (9) are identical individual structures that are, in one preferred embodiment, made from injection-molded polypropylene. These rotor elements (9) compose a completed rotor structure by being stacked one on top of another building up the completed rotor shape and working surface. Air, or water, generators exposed to the outdoor environment must survive temperature extremes, salt-water, moisture, vibrations, chemical corrosives, particulates, and the high forces available in high wind speeds. The rotor element (9), which is duplicated and stacked with interconnecting tongue and groove slots and extensions are constructed to rotate a total of 90 degrees from bottom element to top to complete the rotor structure.

The turning angle of each element will follow the equation of turning angle equals 90 degrees divided by the number of elements. This complete rotor assembly, composed of identical rotor elements (9) is sandwiched between the top bearing (12) and the bottom bearing (7) being in between the upper and lower brackets. Positioned above the vertical axis created by the rotor elements (9) an electric generator, preferably a low revolutions per minute direct current or alternating current motor (13) is attached to the top bracket from the center axis. The generator (13) is preferably mounted above the upper support arm (4) to support the generator separately from the rotor elements (9). The bottom support arm (5) supports the relative weight of the rotor element stack (9). This generator (13) can be direct driven, or through a gear-box, from the top bracket (10) to generate electricity utilizing the low weight, and environmental survivability of injection molded polypropylene. The force of the wind against the rotor elements (9) is translated to the bottom bracket (8), and the top bracket (10) into rotational energy that drives the electrical generator (13) that is seated and supported by the support arm (4) of the mounting assembly (3). When deployed outdoors and exposed to the environment, the specific invention is exposed to a laminar flow of a working fluid. This working fluid can be either air or water. The rotor elements (9) are impinged by the wind where the force of the moving air is translated into a rotational energy, about the vertical axis, which drives an electrical generator. The power available in wind is proportional to the cube of the wind speed, and all direct wind power converter performance can be characterized starting with the specific wind power available to a rotor for direct conversion.

The general formula to describe the power available in wind:

$$P_a = \tfrac{1}{2}\sigma A V^3$$

Where $P_a$ is the power available in watts, $\sigma$ is the density of the air at sea level, approximately 1.25 Kg/m3, A is the cross-section, or swept area of the rotor, and V is the instantaneous free-stream wind velocity. The specific invention provides a means of converting this power with increased utility, as the rotor elements (9) are able to accept a wind flow from any direction. The specific invention presents a greater resistance to a moving working fluid on the down stream side of the flow, compared to the up stream side, which induces a rotation in the down stream direction, from which, the specific invention extracts useful work.

Figure 2:
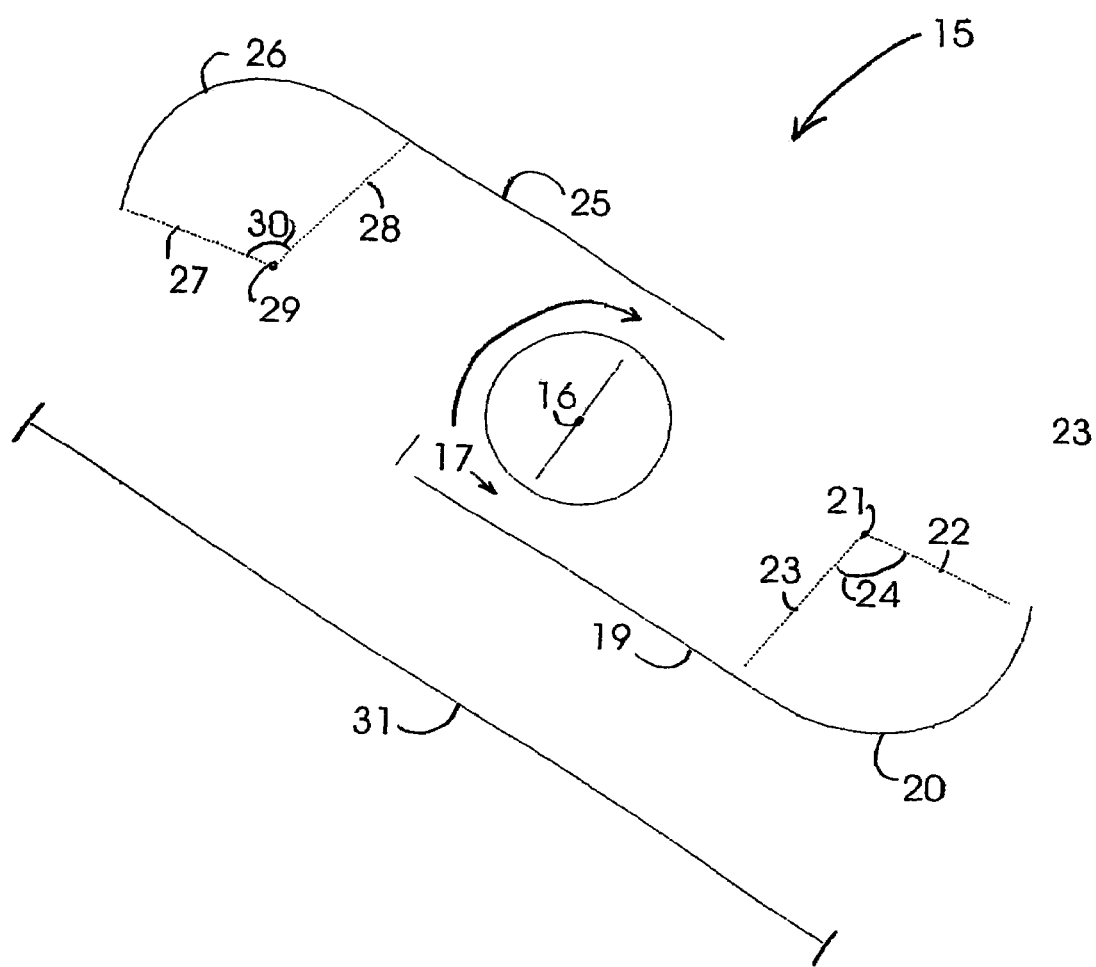

FIG. 2. (15) shows a top view of a traditional drag-type rotor geometry. On either side of a center axis (16) two extending arms (19) and (25) which reach in opposite directions and which are overlapping the center axis (16) and are gapped by distance (17) from the center axis. These extending beams (19) and (25) are each tipped with a curving section which has a distance (20) and (26) and make an angle from each end-point of 130 degrees from a relative center point (21) and (29) of each arm respectively. Each of these relative center points (21) and (29) can be further defined as end points for radii which start at the relative center point and extend to the end-points of the curved sections (20), and (26). These radii (22) and (23) for the relative center point (21) make an angle (24) of 130 degrees of a circle. Radii (27) and (28) make an angle (30) from the relative center (29) of 130 degrees of a circle. The swept area cross-section of the composite rotor is defined as the distance (31). These general relationships can be optimized to suit a particular performance parameter and objective. The specific invention provides the means to alter these relationships to suit the specific site characteristics and requirements, while maintaining its high utility.

Figure 3:
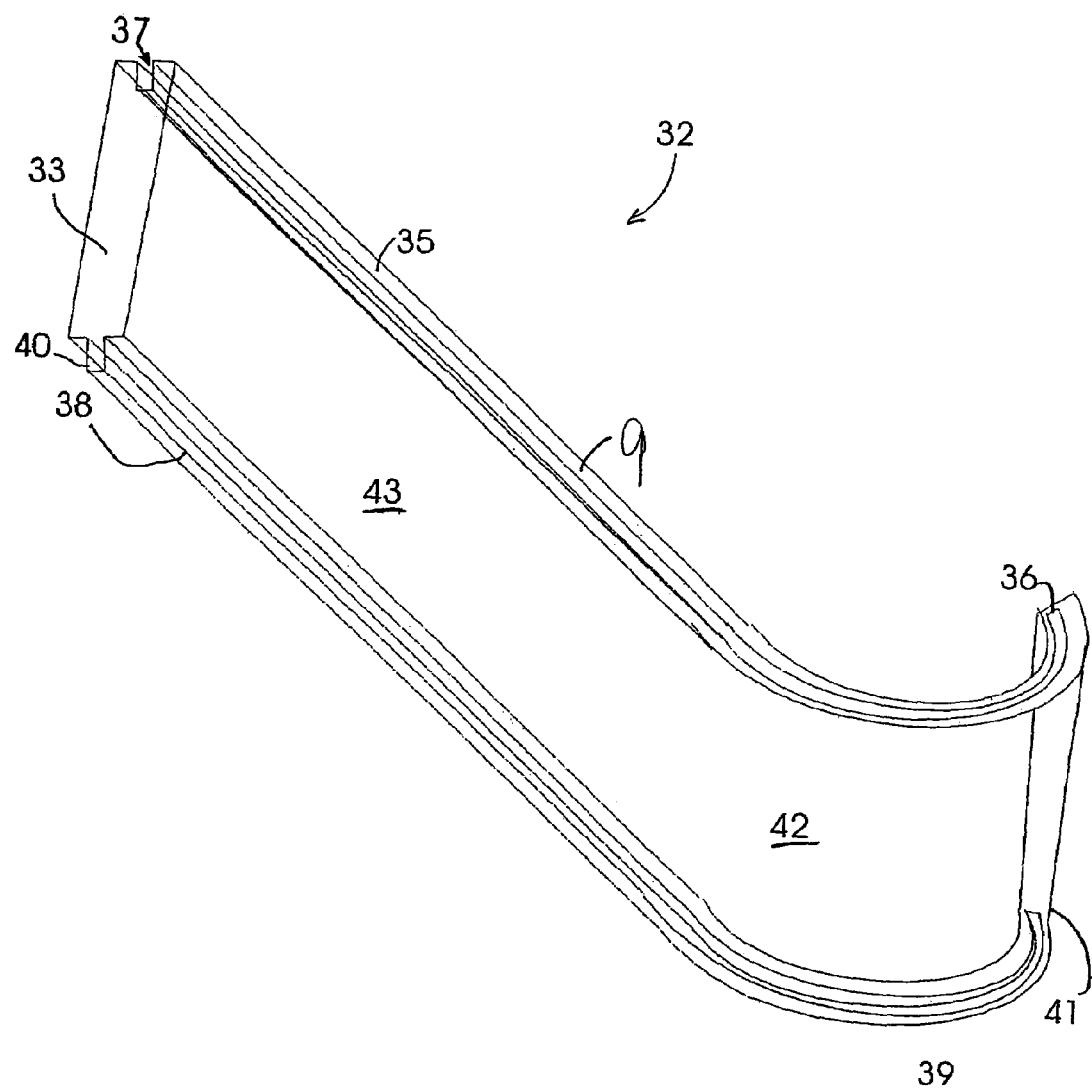

FIG. 3. (32) shows a perspective view of the individual rotor element (9) which is stacked to compose one vertical half of the complete rotor shape. The individual rotor element (9) is composed of materials and techniques known in the art which are strong, durable in the outdoor environment, preferably injection-molded polypropylene providing a means of high strength due to internal structuring of cross lattice and bracing which is known in the art of plastics fabrication. The individual rotor element (9) as shown in (32) provides views of its back-side (33). On the top-side of the element (35) a groove (37) is provided which goes along the longitudinal length of the element and provides a turning angle with the bottom side (38) and the bottom tongue structure (40). This turning angle is defined as 90 degrees divided by the number of elements chosen to produce the complete vertical structure. The up stream side of this rotor element (43) is produced to be smooth and offer the least wind resistance as it travels on the up stream side of the rotation, the curved surface (42) presents a 130 degree section of a circle to complete the entire structure of extension arm and curved finish and end point (41). The finishing position of the end (36) of the top structure groove is such that nearly the entire length of the tongue and groove structure provides a means of transferring the power of the wind, or water, on the working surface into a rotational force about the vertical axis of the rotor generator assembly.

Figure 4:
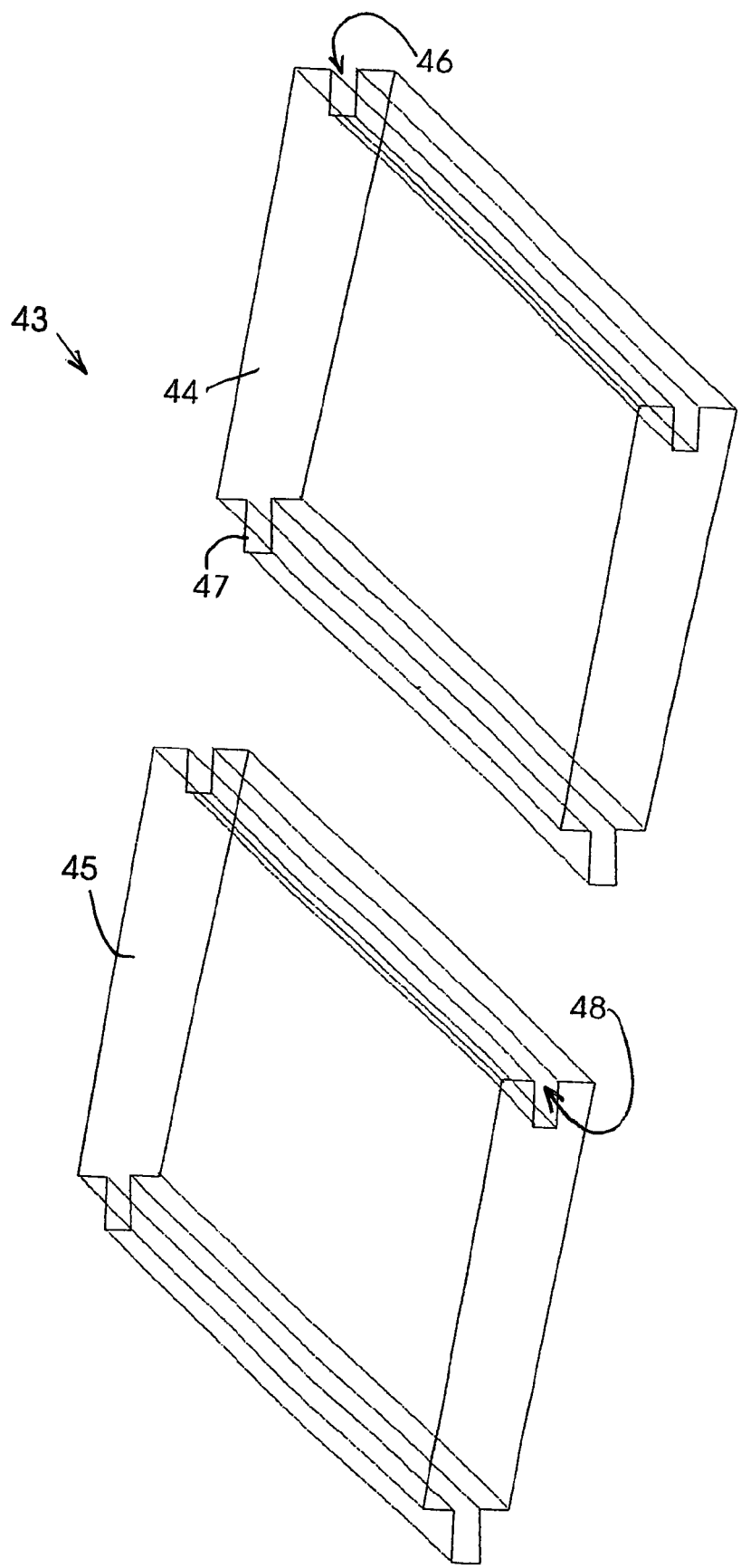

FIG. 4. (43) shows a perspective view of two straight elements (44) and (45). These elements are drawn in straight lines for clarity. Each element has a top groove (46) and a bottom tongue (47). Tongue (47) of element (44) becomes the male connection for a female receiver groove (48) on the other element (45). In this way elements are interconnected mechanically, and transfer the multi-directional forces of the wind into a steady and rotational movement about the vertical axis of the apparatus.

Figure 5:
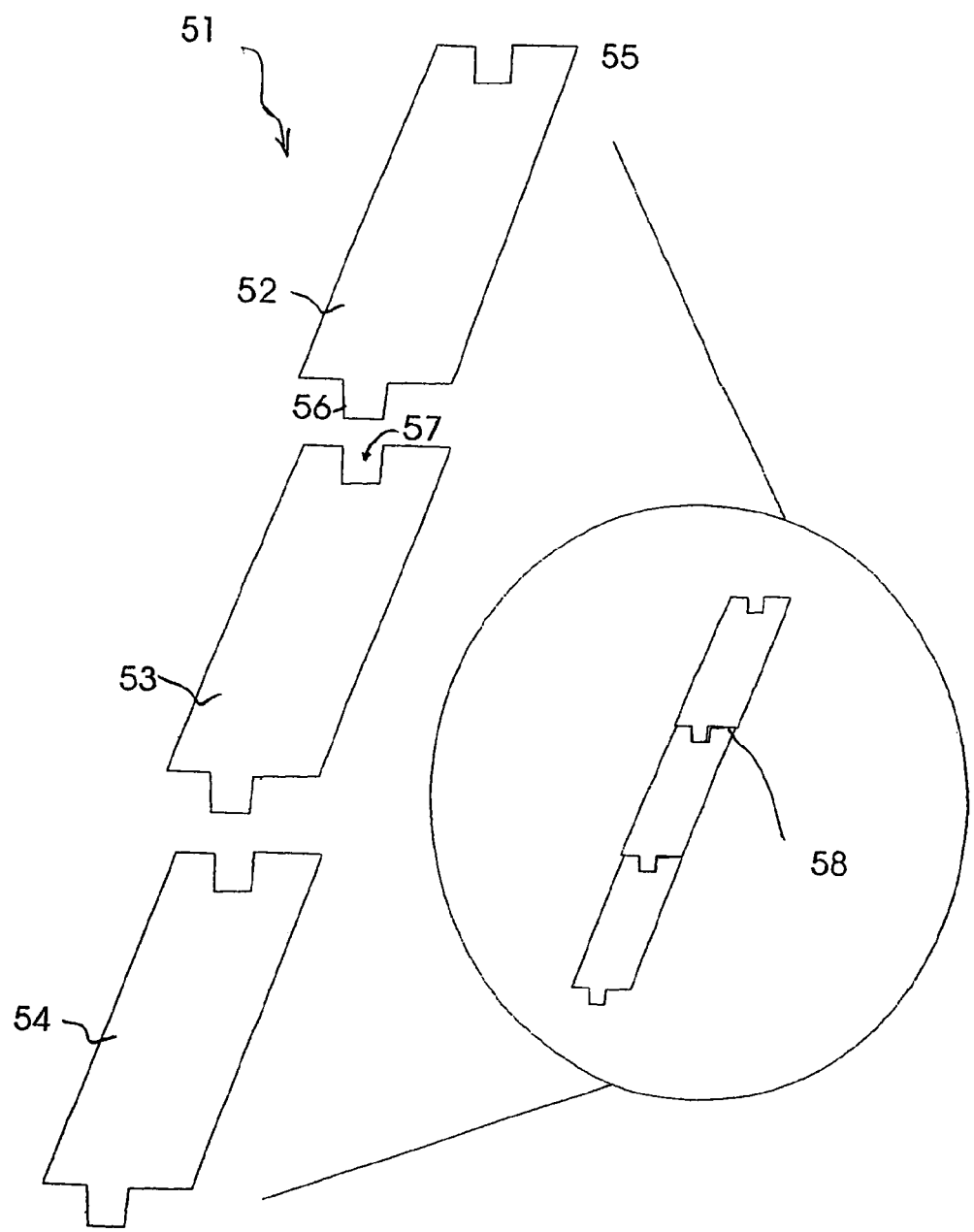

FIG. 5. (51) shows three such elements in cross-section view which add an additional rotation. Rotor elements (52), (53), and (54) are interconnected through tongue (56) and groove (57) elements and when compressed form a composite structure as represented by (58). Each rotor element has a turning angle built into its structure as the turning angle, described above, dictates the rate of turn as a function of the number of elements used. Their total must be 90 degrees from the bottom of the structure to the top. View (51) introduces an additional vertical turning angle that makes a seamless transition from element to element completing the rotor structure. This turning angle is orthogonal to the tongue and groove horizontal plane.

Figure 6:
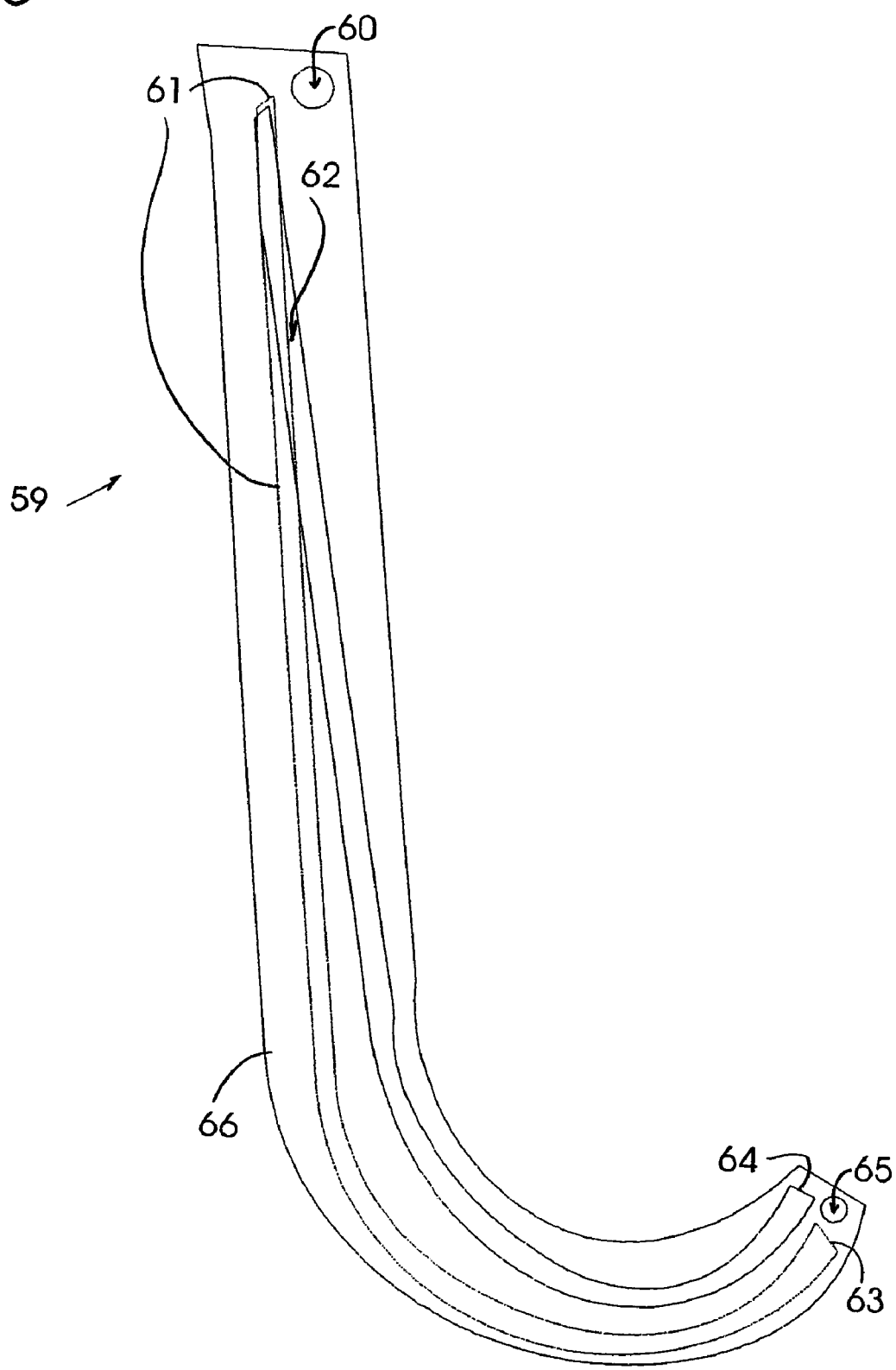

FIG. 6. (59) views the top of the rotor element (66). The top groove of the rotor element (62) is designed to provide the track for the bottom tongue (not shown) of the next element in the stack. (63) is the end point of the bottom tongue (61), and (64) shows the end point of the top groove. Holes (60) and (65) which travel vertically through the element provide additional means of interconnecting and strengthening the interconnection through a cable or fastener. Tightening this cable produces a compression that holds each rotor element in place. Compression is also achieved by correctly positioning the lower and upper bearing assemblies and brackets, as described above.

Figure 7:
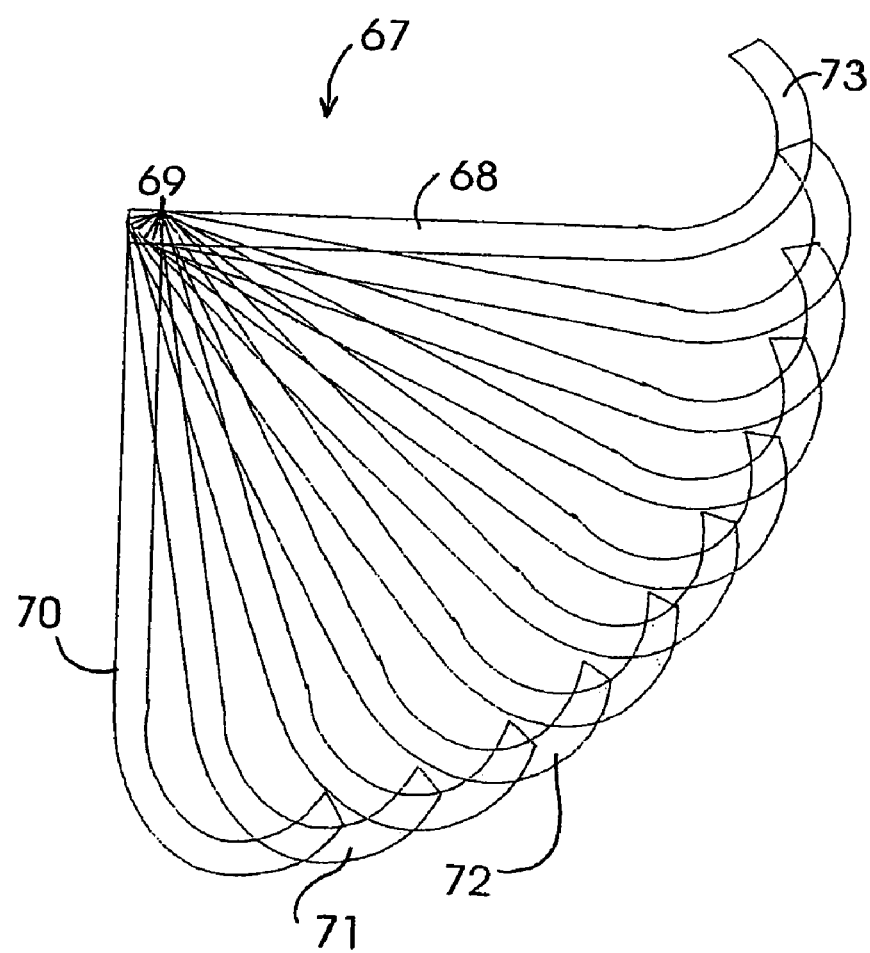

FIG. 7. The structure (67) shows a top view of relative relationships between the bottom element (70) the rotor elements (71, 72) with turning angle grooves which when stacked produce a structure that ends with a top element (73) which fits into the top bracket (68). The bottom element (70), the stack of rotor elements (71, 72), and the top bracket (68) all rotate about the point (69). The hole (60) depicted in FIG. 5 would be positioned at the point (69) for a giver stack.

Figure 8:
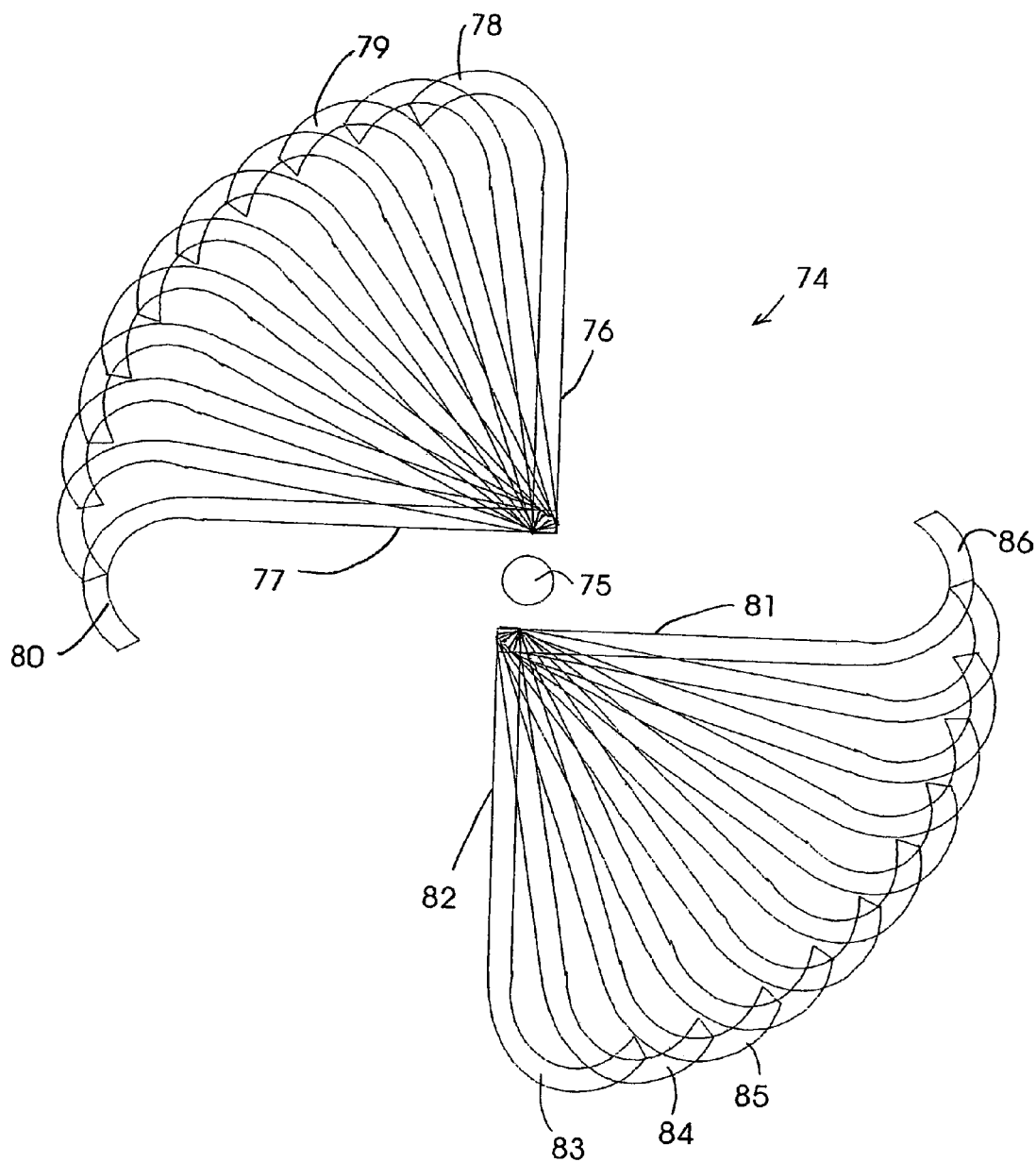

FIG. 8. (74) shows a top view of the full rotor structure which is composed on either side of a center vertical axis (75) and is positioned as depicted. A bottom bracket (82) is shaped to accept the bottom of the first rotor element (83) and is stacked with rotor element (84), as described above, interconnects the elements (85) to produce a stack which ends with element (86). The top bracket (81) completes this rotor structure. An exact duplicate rotor is assembled from bottom bracket (76) and similarly composed from rotor elements (78) and (79) ending with element (80) which fits under the top bracket (77). This complete structure composed of two identical stacks, created, in turn, with identical rotor elements and positioned opposite and about the center axis form the complete rotor structure which transfers the force of the wind against the rotor into a tangential force which is transferred by the bottom and top brackets into a rotational torque which drives the electrical generator.

Figure 9:
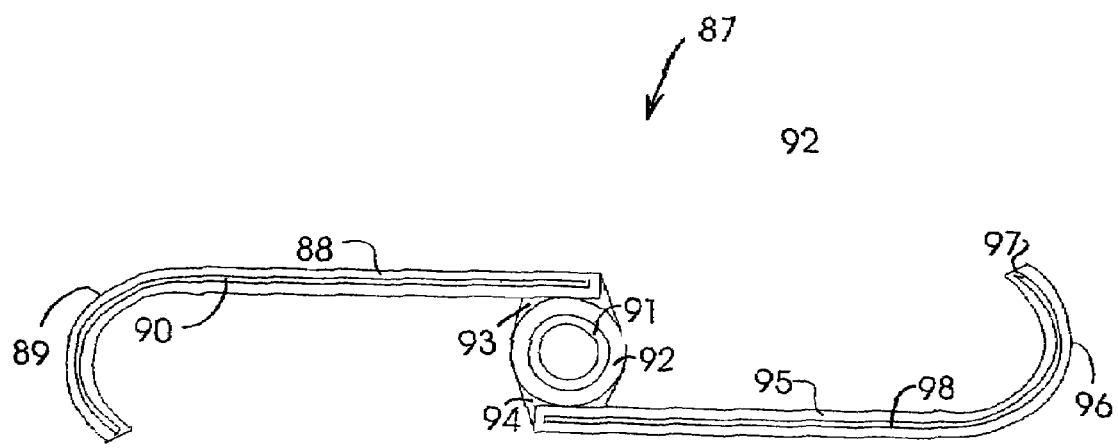

FIG. 9. View (87) is the top view of the bottom and upper bracket. These brackets are identical with the bottom bracket shaped to receive the bottom of the rotor element, and the top bracket inverted and shaped to receive the top of the upper rotor element. The bracket (92) is preferably constructed as a single die cast aluminum, or other suitable material, piece. This bracket will provide for the weight-bearing load, as in the case of the bottom bracket, or the top positioning bearing, in the case of the upper bracket. This bearing (91) is co-axial with the vertical axis of the rotor assembly and is either connected as pieces or cast as a single element which has two extending arms (88) and (95) which attach about the center axis through struts (93) and (94) which maintain an integrity about the bearing (91). The extending arms (88) and (95) contain grooves (90), and (98) which seat the bottom and top rotor elements. The grooves extend to the end point depicted by (97). This view (87) shows the curve of the circular section of 130 degrees (96), and the up stream side of the element (89).

Figure 10:
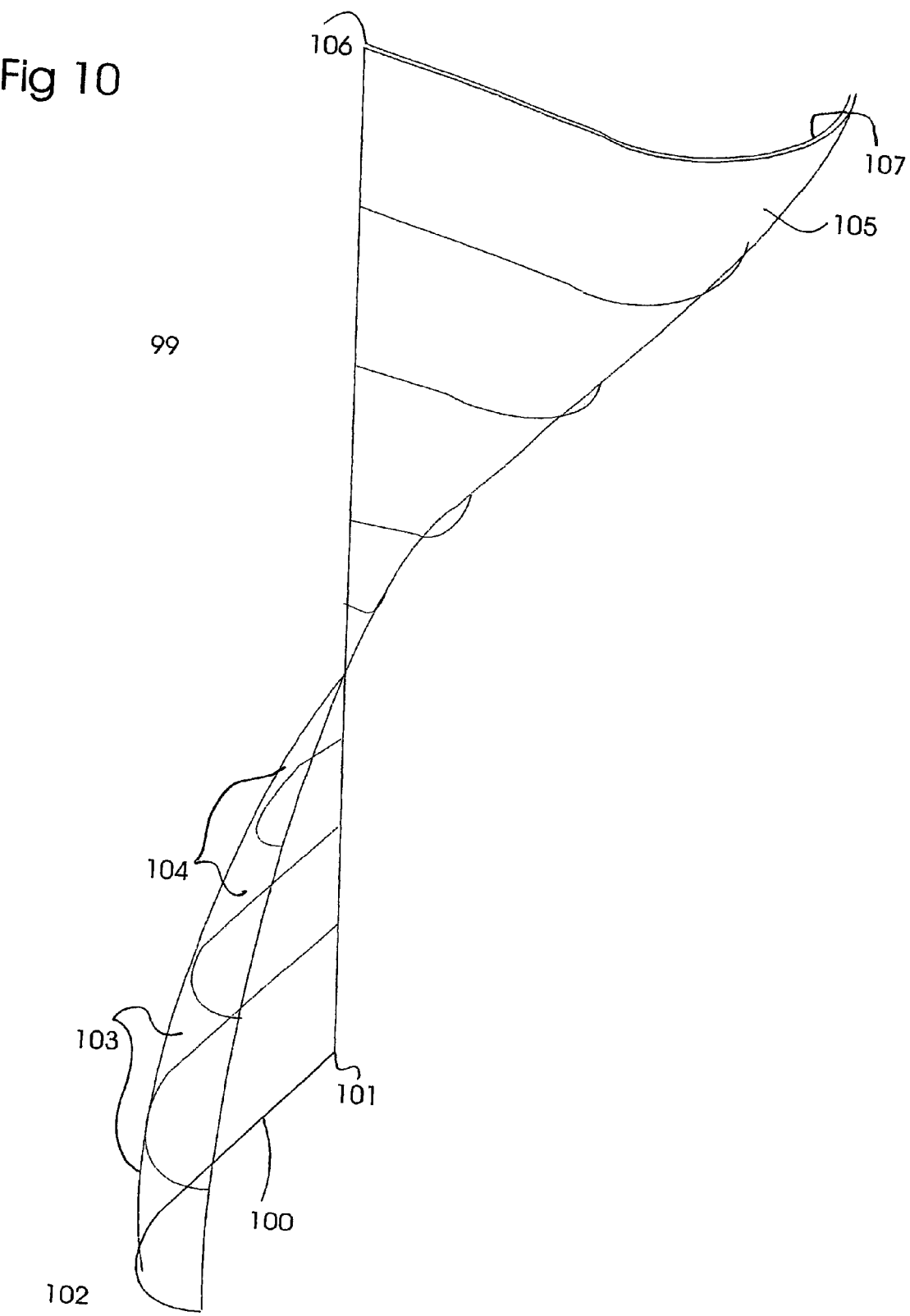

FIG. 10. View (99) shows the completed rotor assembly that composes half of the total rotor structure. The bottom bracket (100) supports the first identical rotor element (103) and a rotor structure is built stacking the identical individual rotor elements (104) ending with element (105) which fits into the bottom of the top bracket (107). The points (106) define the top of the vertical axis and point (101) shows the bottom of the vertical axis. This composite structure composed of individual rotor sections produces a light-weight, durable air rotor which when duplicated into a pair of stacks and positioned 180 degrees apart produce the entire rotor assembly. This produces an increased utility as very large, or small, rotors can be constructed by this elemental segmented technology.

Figure 11:
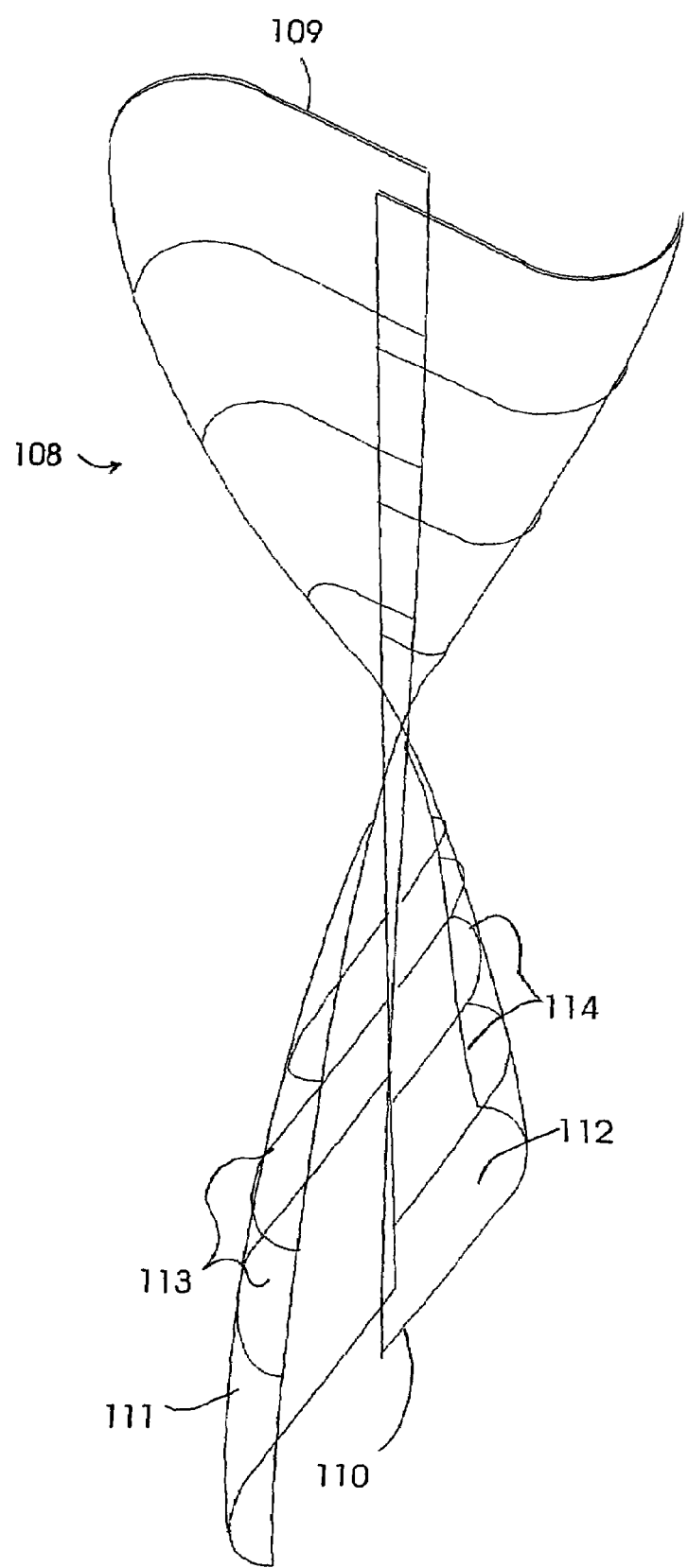

FIG. 11. View (108) shows the completed structure which will fit between the top (109) and bottom (110) brackets. Rotor elements (111) and (113) represent the stack of one rotor structure, and rotor elements (112) and (114) represent the duplicate stack which is positioned 180 degrees opposite the first stack. This total structure, created by stacking the specific invention rotor elements, produces a complete rotor structure which can be mounted from the side, or on the top of deployment poles.

Figure 12:
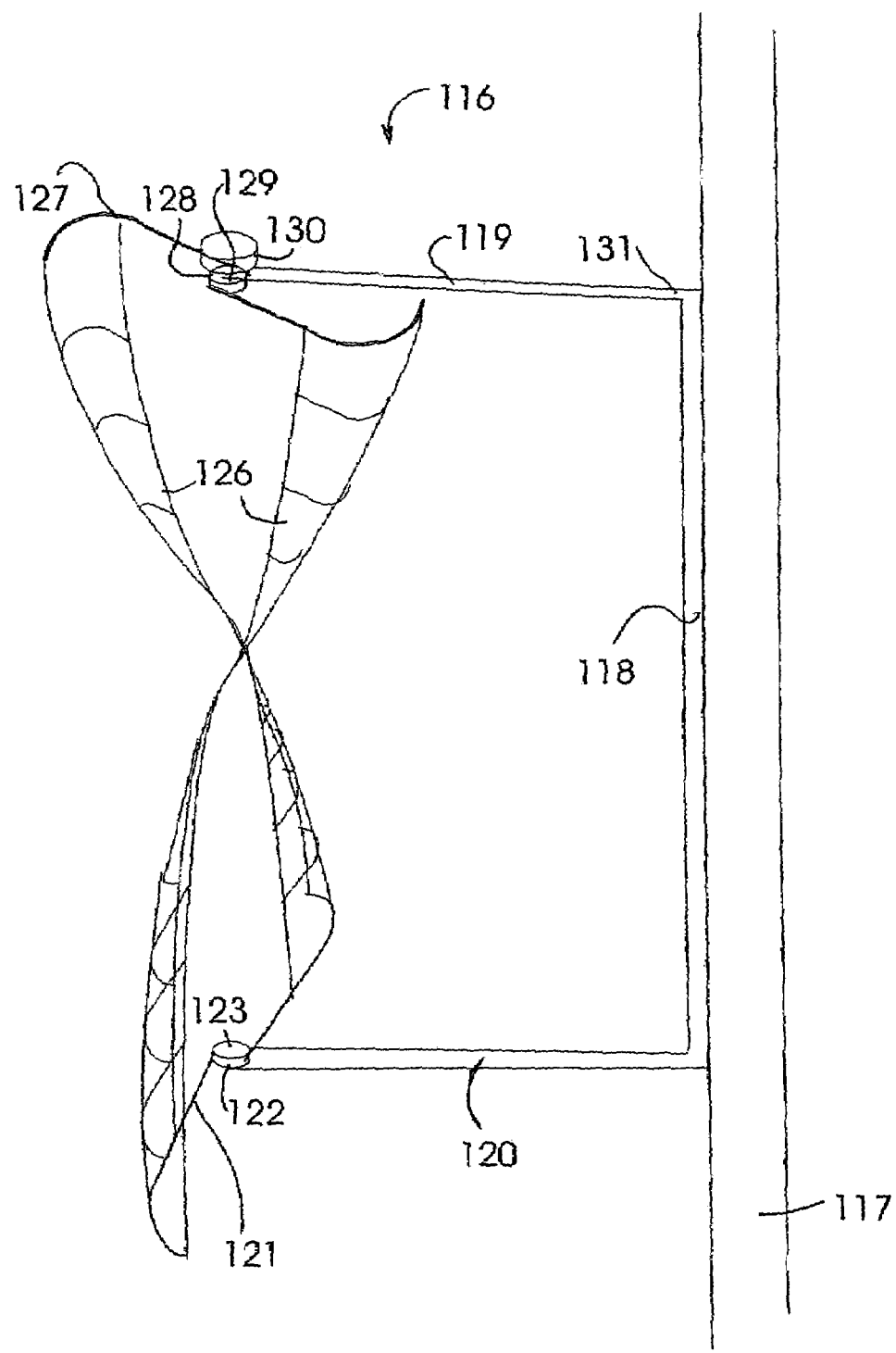

FIG. 12. View (116) shows another preferred embodiment of the specific invention which is composed of a mounting bracket (118) attached to a vertical pole (117) from which a lower support arm (120), and upper support arm (119) extend to support the specific invention, and provides a pathway for the electrical leads (131) to exit the generator and to the load. A weight-loading bearing (123) is seated in a bearing support (122) which is integrated into the support arm (120). The bottom bracket (121) as described above supports the rotor element stack (126). This embodiment of the specific invention is an edge-effect drag-type rotor as the truncated rotor elements do not extend to the center axis, as stated above, but are truncated and placed at the extended end of the support brackets upper (127), and lower (121). By eliminating the rotor element material near the center axis, a utility is demonstrated by using the least amount of material for the rotors, as the center sections are not present, minimizing the air resistance on the up stream side of the rotation, and maximizing the allowable torque produced by the rotor due to the extended radius of the rotor element active areas from the central vertical axis. An upper bearing seat (128), and bearing (129) are positioned into the end of the upper support arm (119) such that the generator (130) is over the vertical axis of the rotor assembly. Due to the active surfaces being as far as possible away from the center axis less resistance is presented to the up wind side of the rotation and provides a greater utility of power derived directly from a flow of wind, or water.

Figure 13:
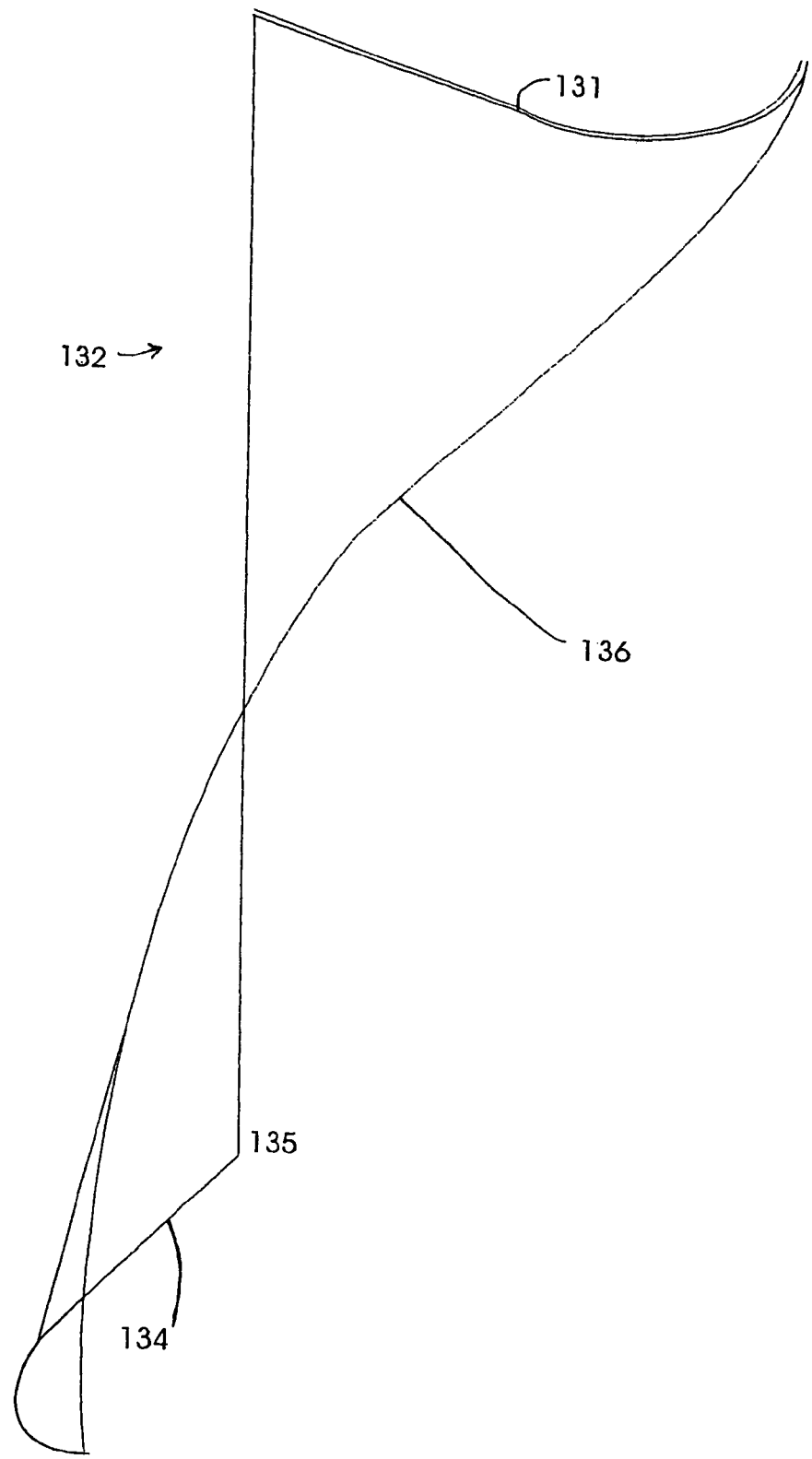

FIG. 13. In yet another preferred embodiment of the specific invention, view (132) shows the rotor assembly not composed of individual elements but rather is composed of a single element. This single integral element (136) is composed of a lower edge (134) which fits into a bottom bracket as described above, and into a top bracket (131) as described above. These brackets form an angle of 90 degrees from one another. The height of the rotor will follow a general rule of 4:1 over the width. The view (132) shows this single element as it is understood that a full rotor architecture involves two of these structures positioned 180 degrees opposite each other along the vertical axis will have a height to width ratio of, but not limited to 2:1.

Figure 14:
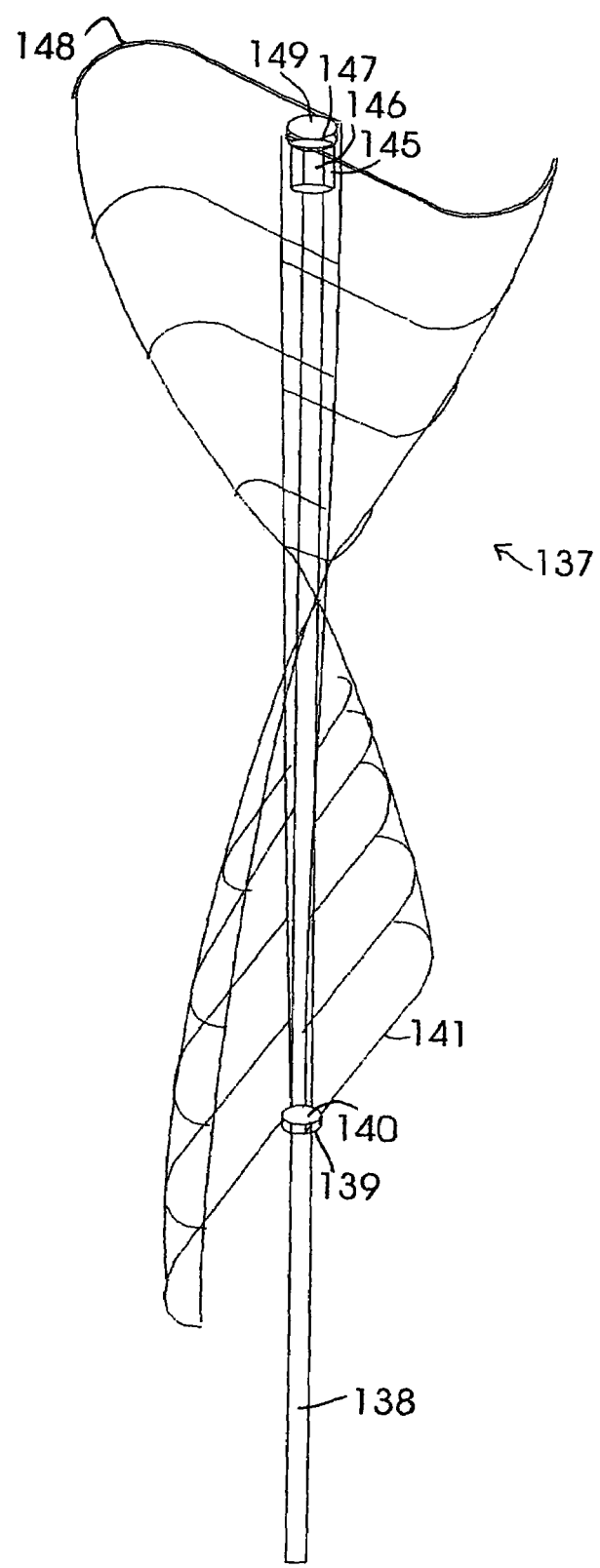

FIG. 14. View (137) shows another preferred embodiment of the specific invention as it is deployed from a vertical pole (138). In this preferred embodiment the vertical pole extends through the bottom weight-loading bearing (140) which is seated in a bearing support element (139). A bottom bracket (141) supports rotor elements, either stacked, or singular. The view (137) depicts two rotors stacks, or single formed elements, sandwiched between the bottom bearing assembly and the top bearing seat (145), and the top bearing assembly (146). The pole (138) extends through the vertical axis of the rotor, through the bottom bearing assembly up to the top of pole assembly. This assembly includes a masthead enclosure (149) made from anodized aluminum, or other suitable materials, and houses the electrical generator (147) with leads directed down the pole. The top bearing (146) attaches to the top bracket (148), and the rotational energy of the rotor assembly, which doesn't touch the center support pole (138), except during the bearing assemblies, turns the generator producing electrical power. When siting a wind generator in high wind location, this center pole deployment provides additional stability to deal with wind gusts, and other violent externalities such as earthquakes.

Figure 15:
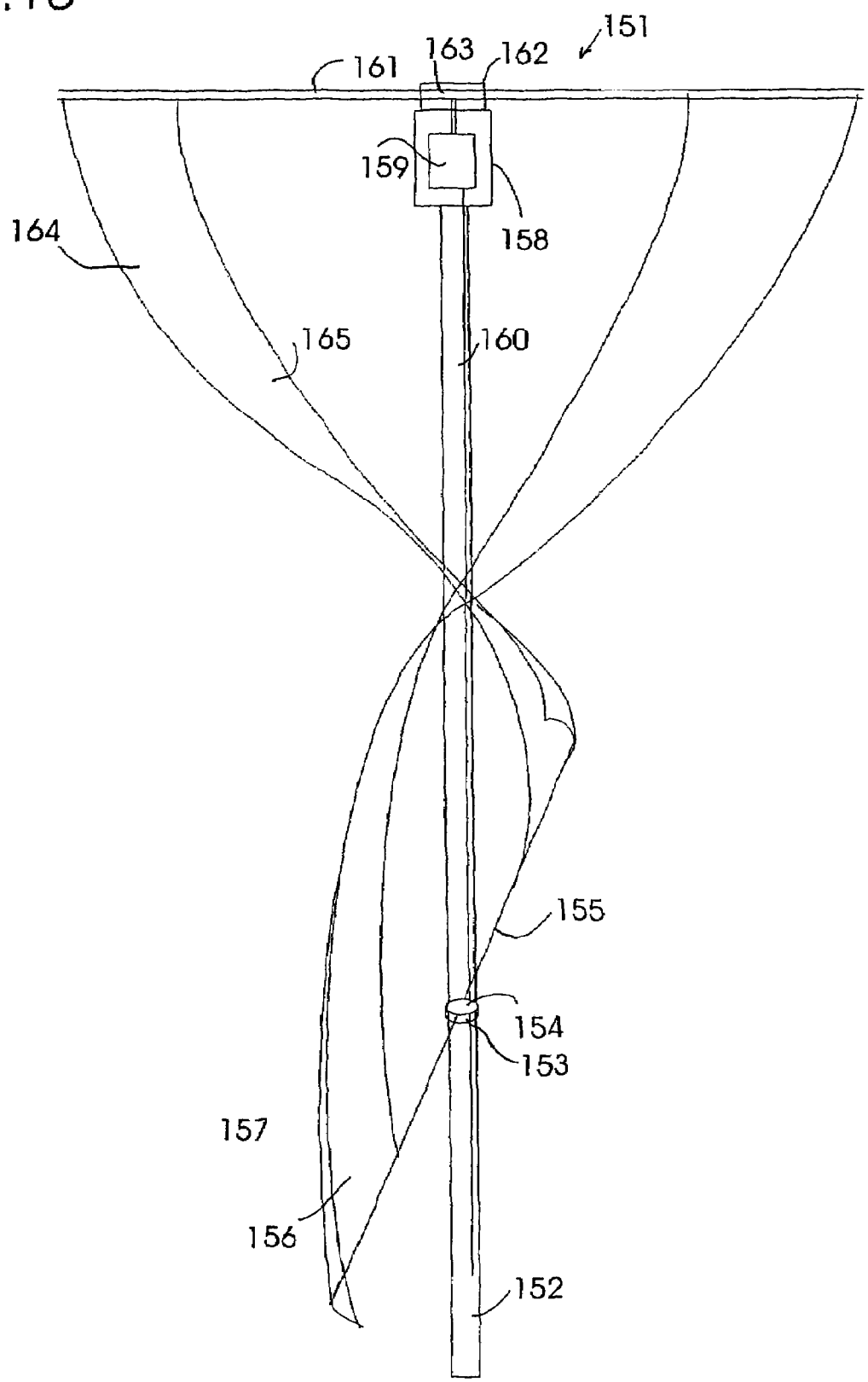

FIG. 15. View (151) shows a perspective view of another preferred embodiment of the specific invention using the edge-effect rotor elements described above. Mounted on a vertical pole (152) which extends upward through the specific invention and along the vertical axis of the rotor assembly (164) a lower mounting bracket (155) is attached to a weight-loading bearing (154) which is seated in element (153) which supports the bearing to the pole (152). The rotor element (156) which is duplicated and stacked to form the working surfaces (165) of the rotor assembly is positioned at the end of the radius arms of the top bracket (161) and the lower bracket (155). The rotor elements are positioned at the end of the radius arms of the brackets to produce maximum torque from the force of the wind, or water, on the rotor elements. At the top of the pole (152) a masthead enclosure (158) is shown which houses the generator (159) positioned such that the generator shaft is along the vertical axis of the rotor. Positioned above the masthead is a bearing seat (162) and a bearing (163) which connects, and keeps in line with the vertical axis the rotor assembly (164). Electrical leads positive, negative and ground, extend downward from the electrical generator, and through the mounting pole (152) to the ground. The open area around the vertical axis (160) provides a maximum utility as the least amount of rotor material is required to extract the most torque from the force available in moving wind or water.

Figure 16:
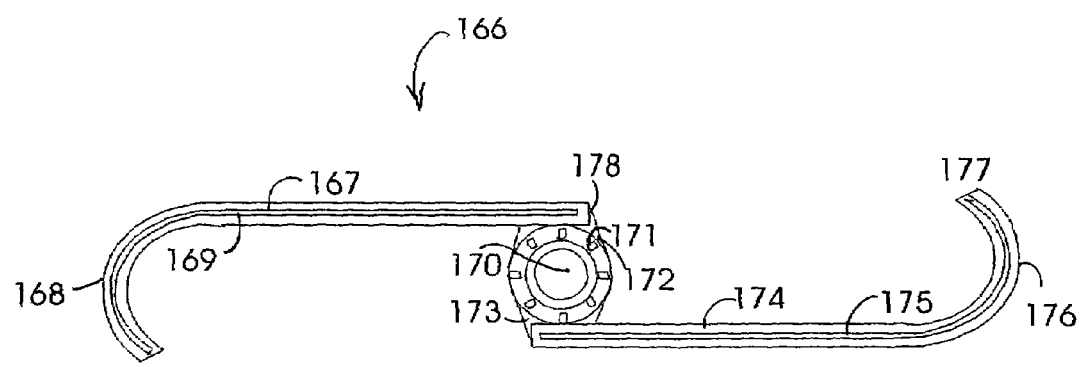

FIG. 16. View (166) shows another preferred embodiment of the specific invention by illustrating a rotor element intended for extreme weather conditions such as Antarctica, which have extreme temperature, vibrations, particulates and stresses due to wind gusts. In its preferred embodiment, though not limited to this embodiment the air rotor element is produced as a single injection molded piece of polypropylene. A center ring about the center axis (170) is shown from which is composed a toothed disk (171). The teeth are sized to allow the vertical interconnection of these individual rotor elements bottom to top and provide a turning-angle which is defined by the quotient of 90 degrees divided by the number of elements used to complete the vertical structure which is defined further by the rotation of the bottom and top brackets of 90 degrees. From this center hub, sections (173) and (172) attach radial arms (174) and (167), respectively. These arms are terminated by a section of circle (168, 176) defined by a rotation of 130 degrees from end-point to end-point with one of those points the end of the radial arm, which extends in opposite angle from the hub as described above. A groove is fashioned (169) on the top of the rotor element and is set at a turning angle with the bottom tongue is consistent with the rule stated above. The groove (175) on the top of radial element (174) provides the track for a rotational turning angle. This entire structure (178) can be formed as a single structure by means known by those skilled in the art.

Figure 17:
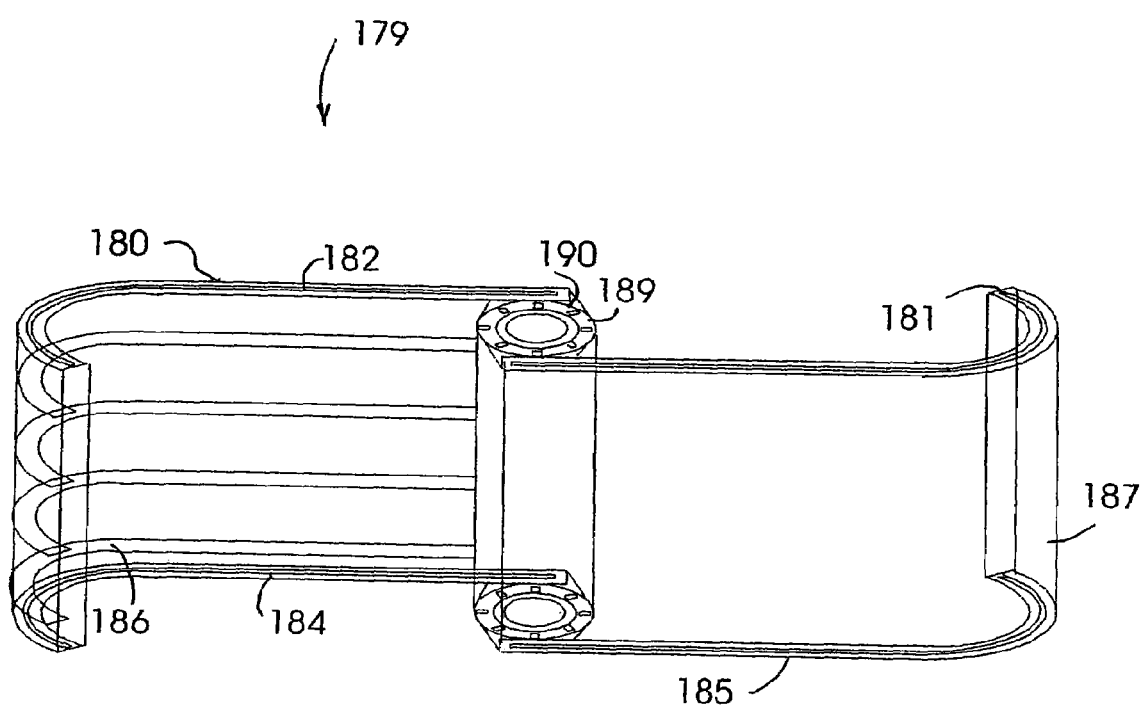

FIG. 17. View (179) shows a perspective view of a preferred embodiment described in FIG. 16. This view shows the hub of the structure (190) which contains the outer disk support ring (189) that supports and attaches the radial arms (180) and (185) with the hub. The hub is aligned with the vertical axis of the rotor assembly. Turning angle grooves on the top (182) are shown with tongue extensions (184) shown on the bottom. This tongue and groove structure provides a rotation as the elements are stacked at a turning angle defined by 90 degrees divided by the number of rotor elements. (181) shows the end point of the curve terminating the extended structure with (187) showing the smooth up wind side of the rotor which presents the least resistance to the wind. On the down wind side of the rotor element (186) are ridges of material formed to provide a maximum strength in keeping its form under wind or water stress. This entire element is produced by a single injection molded element.

Figure 18:
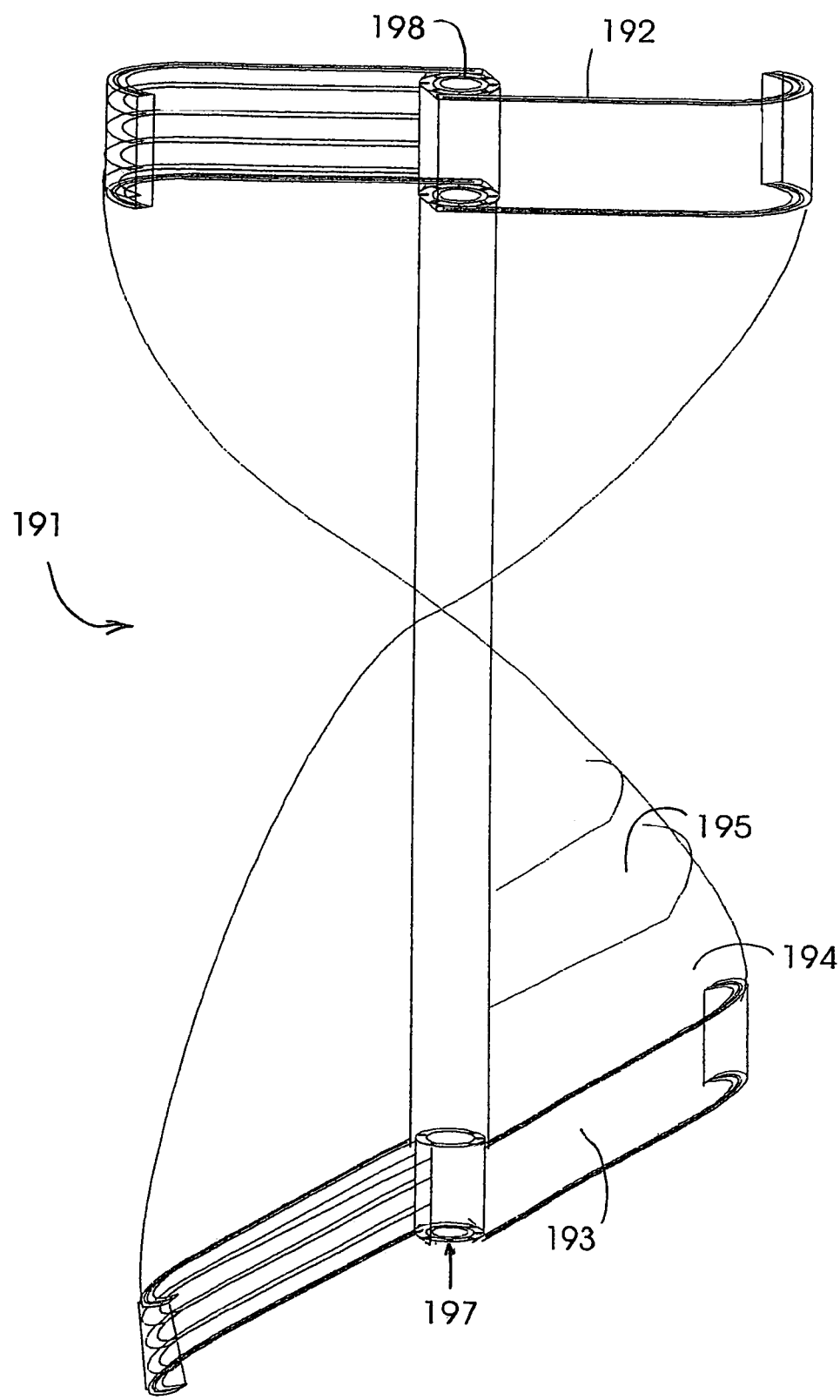

FIG. 18. In another preferred embodiment of the specific invention view (191) shows the entire rotor assembly composed of the identical elements described above in FIG. 17. This rotor element (193) establishes its own vertical axis as shown in (197) which when assembled will have a top point (198) centered above the vertical axis. This structure is integral as each element mates to the other and when compressed forms a solid structure capable of transferring the wind force on the rotor into a rotational torque about the vertical axis of the specific invention. Rotor elements (194) and (195) building up to rotor element (192) stack as described. This preferred embodiment is suitable for the lateral mounts described in FIG. 1, and a top of pole mount where this rotor is attached to a masthead at the top of the mounting pole.

Figure 19:
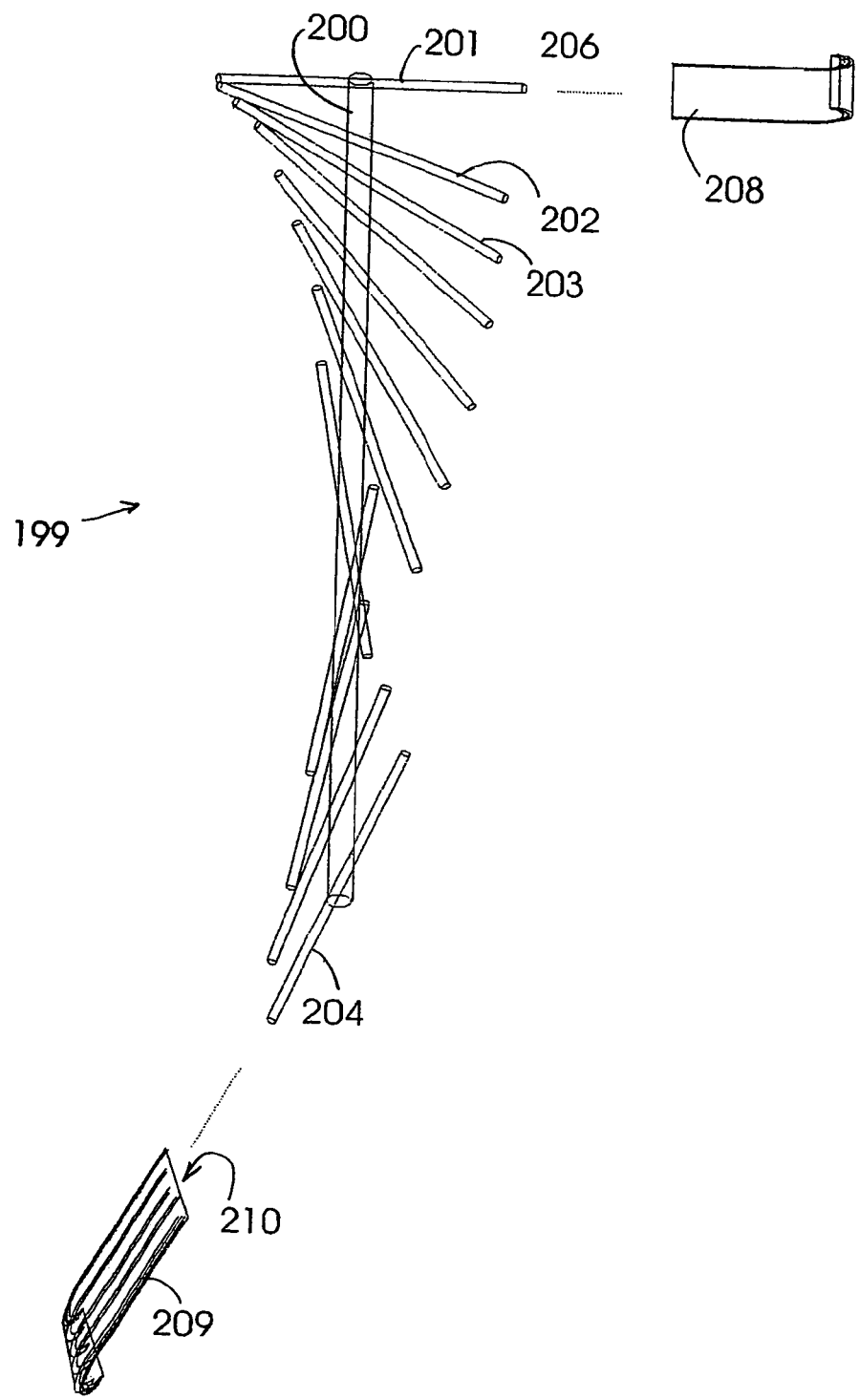

FIG. 19. View (199) is of yet another preferred embodiment of this segmented air rotor. A vertical beam (200) is drilled with lateral holes such that a lower strut (204) is placed through the vertical beam (200) orthogonally on a horizontal axis extending an equal distance on either side of the vertical beam. These horizontal struts (201), (202), (203), and (204) are placed up the vertical beam at a turning angle consistent with the rule of the turning angle equals 90 degrees divided by the number of rotor elements. These horizontal elements then form a progression of horizontal struts that form a 90 degree angle from the bottom to the top viewed from one side. The extended arms of the rotor element described above in FIG. 18, are drilled along the longitudinal axis such that the up stream side of the rotor element (208) is opposite the rotor element (209) which is positioned and fastened the same way going the opposite direction on the other side of the strut. The bottom element (209) has this longitudinal hold (210) through which a screw or other suitable fastener attaches the rotor element to the horizontal support strut. Using this embodiment a strong, and light weight rotor assembly can be composed of identical individual rotor elements attached to a vertical beam (200). This rotor assembly can then drive an electrical generator as described above. This embodiment is especially suited to use in moving water due to its high structural integrity.

Figure 20:
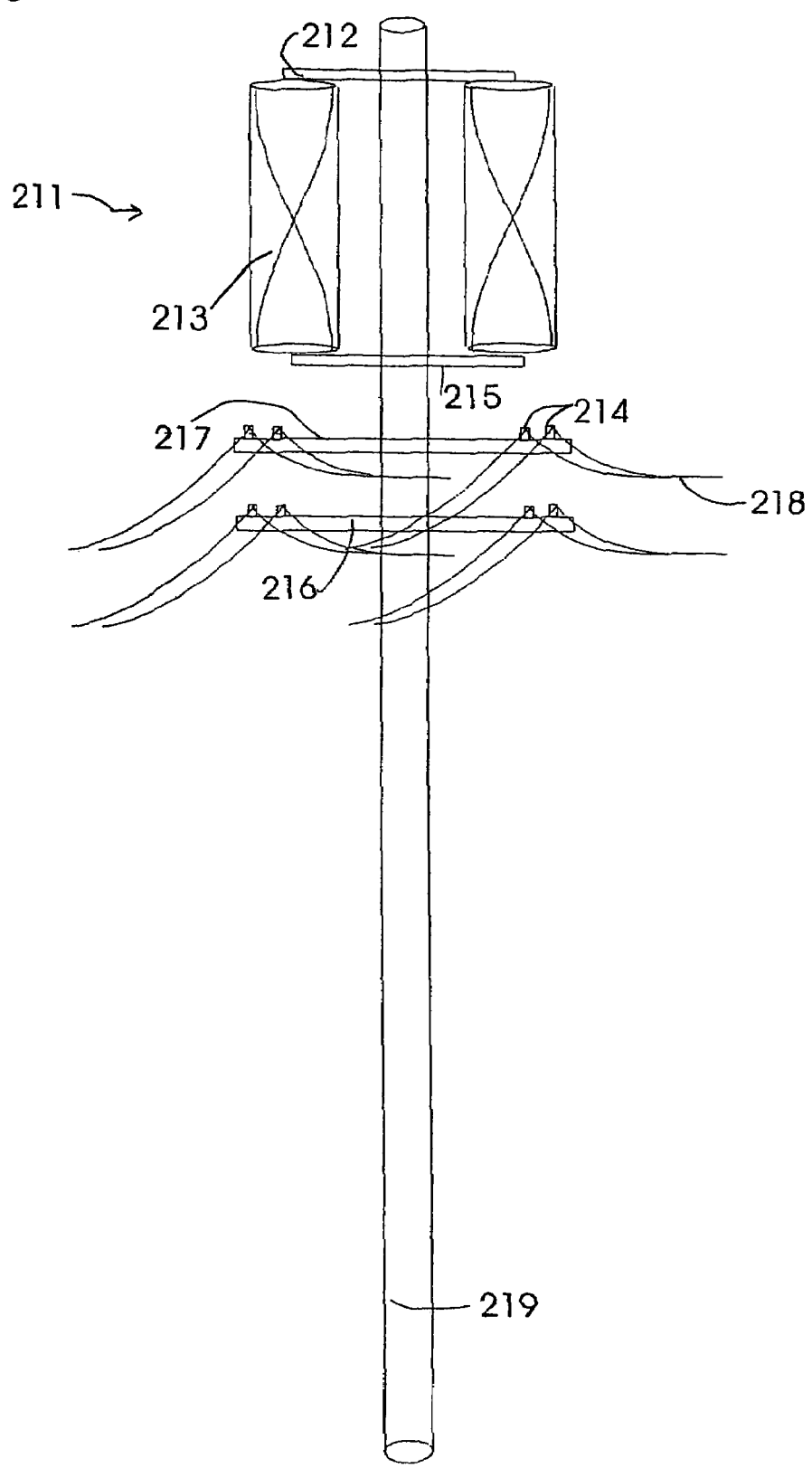

FIG. 20. View (211) shows another preferred embodiment of the specific invention as applied to electrical power transmission poles. A vertical pole (219) is fitted with a mounting bracket as described above (212) which supports a lateral mounting of the specific invention (213). Deploying the specific invention as depicted in this view produces an additional utility and option for power production and distribution as the specific invention provides a means of producing power and distributing that power to consumers on a network interconnecting a single apparatus. The bottom-mounting bracket (215) is shown supporting the weight of the air rotor assemblies above the power transmission wires (218). Cross beams (217) and (216) support electrical isolators (214) that electrically isolate the transmission wires (218). Electrical interconnection, fusing, grounding and power conditioning are known in the art. The deployment and integration of the specific invention with these available electrical components produces an increased utility.

Figure 21:
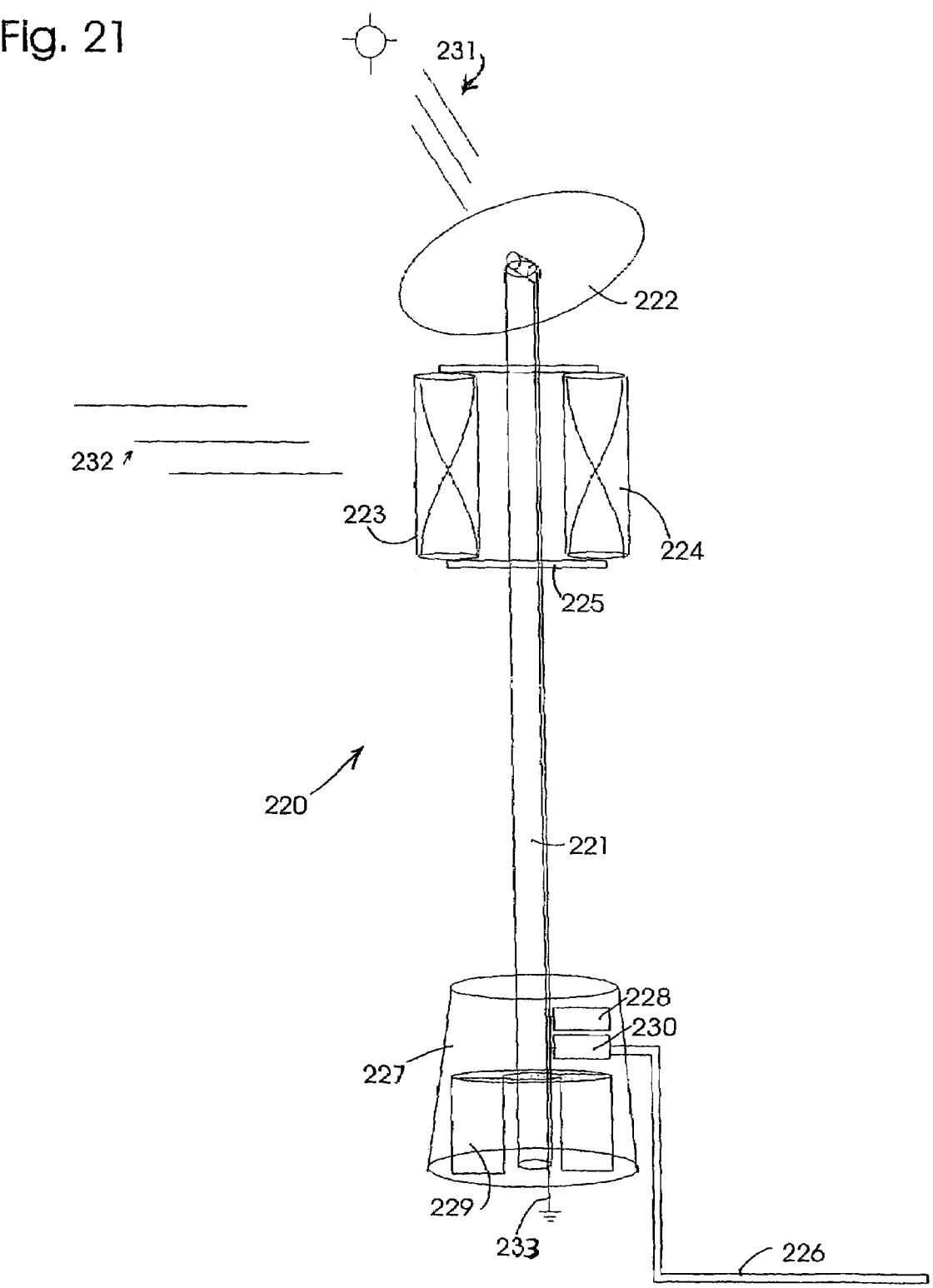

FIG. 21. View (220) shows the specific invention as deployed as complete solar and wind power generation system. Upon a main support pole (221) a photovoltaic panel and array (222) can be mounted either as fixed, adjustable, or active tracking to the masthead of the support pole. Underneath the photovoltaic array is a lateral mounting bracket as described in FIG. 1 (225). This mounting bracket supports two air rotor assemblies (223) and (224) providing a means of supplying solar and wind energy to a charge-controller (228), battery bank (229), and inverter (230) if AC power is required, to provide either grid-tied or stand-alone renewable energy on demand. A suitable outdoor enclosure (227) protects and isolates the electrical components. Electrical energy is transmitted from the specific invention to the load, though not limited to, buried electrical conduit (226) that powers the load. Fusing and grounding (233) are known in the art. Solar power (231) and wind power (232) is captured, converted into electricity, and delivered to a load, on-demand, with increased utility.

Figure 22:
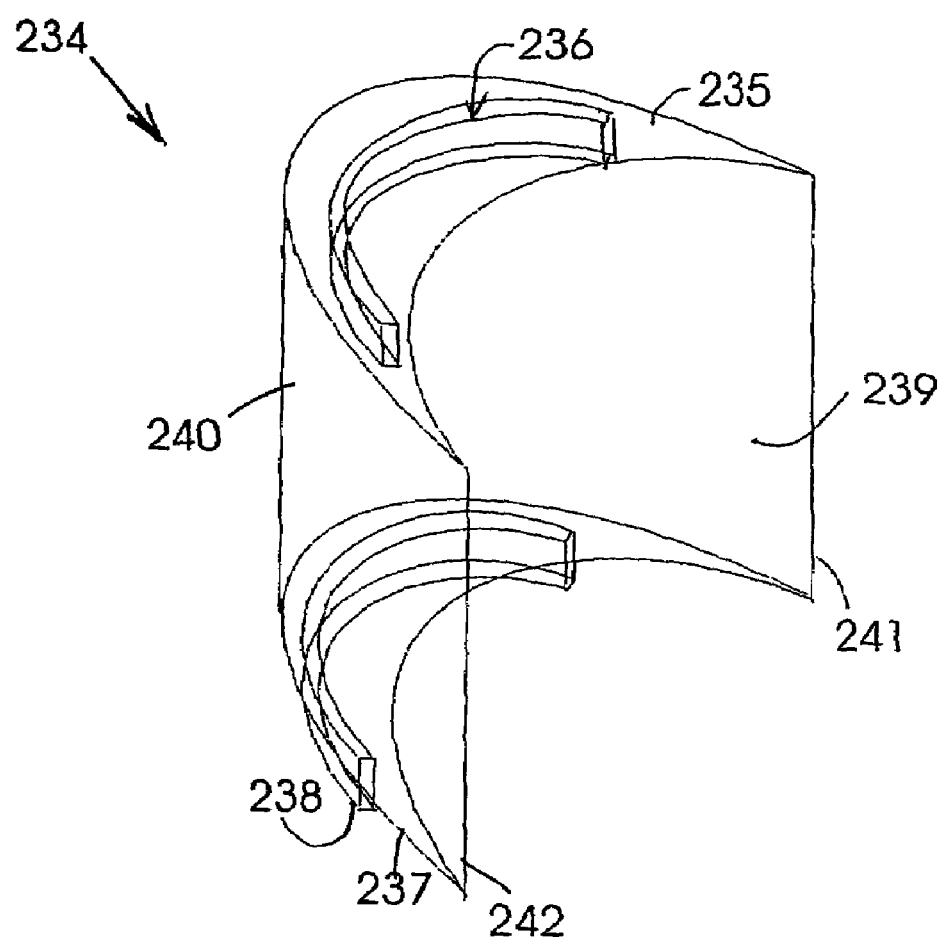

FIG. 22. View (234) shows another preferred embodiment of the specific invention composed as a single element preferably produced by, but not limited to, injection-molding techniques known in the art. This rotor element is to be deployed in a manner similar to those described above. The top of the rotor element (235) is inset with a groove (236) that makes an arc across the element. This groove (236) is the receiver for a tongue (238) that extends from the bottom of the rotor element (237) of the exact shape required to fill the groove (236). The groove (236) is rotated about the center vertical axis of the completed rotor structure a turning angle defined as above as 90 degrees divided by the number of elements used to produce the finished stack. Additional means of interconnection of the identical rotor elements can be employed such as holes with cables that transverse the vertical length of the stack, or epoxies, or other known means of interconnection. The turning angle of the top groove (236) over the bottom tongue extension (238) produce the mechanical means of interconnecting the rotor elements to be sandwiched between the upper and lower brackets as described previously. The front curved surface of the rotor element (239) can be ridged for more friction with the air and internal strength, or can be smooth. The back side of the rotor element (240) is smooth to present the least air or water resistance on the up stream side of the rotation. As an edge-effect working surface, the rotor element presents more resistance on the front side (239) then on the back-side (240). The front surface (239) can further be defined, though not limited to, a section of a circle with a circumference section of 130 degrees as measure from the end point (241), and end point (242). The specific invention when deployed, as described above, produces a drag-type vertical axis air rotor and wind generator apparatus with increased utility over the state of the art.

I claim:

1. An apparatus powered by a fluid flow for generating electricity, the apparatus comprising:
    a center axis configured for rotating in response to the fluid flow;
    a top rotor element coupled to the center axis, the top rotor element including an arm extending substantially perpendicular to the center axis, the arm of the top rotor element movable in response to the fluid flow to effect the rotation of the center axis;
    a bottom rotor element coupled to the center axis, the bottom rotor element including an arm extending substantially perpendicular to the center axis, the arm of the bottom rotor element movable in response to the fluid flow to effect the rotation of the center axis; and
    a plurality of intermediate rotor elements stacked between the top rotor element and the bottom rotor elements; and wherein each intermediate rotor element includes a tongue and a groove for coupling to the adjacent rotor element; and
    wherein the arm of the bottom rotor element is substantially fixed in a position relative to the arm of the top rotor element, wherein the position is offset about the center axis by about 90° from the top rotor element; and wherein the intermediate rotor elements are in positions successively offset about the center axis in degrees to produce the 90° offset of the bottom rotor element relative to the top rotor element.

2. The apparatus of claim 1 wherein at least one of the rotor elements is formed substantially by injection molding.

3. The apparatus of claim 1 wherein at least one of the rotor elements is formed substantially of polypropylene.

4. The apparatus of claim 1 wherein each intermediate rotor element substantially duplicates the other intermediate rotor elements.

5. The apparatus of claim 1 wherein the tongue and groove of each intermediate rotor element are offset from one another to produce the successive offset of the rotor elements.

6. The apparatus of claim 1 wherein the rotor elements include an internal bracing structuring.

7. The apparatus of claim 1 wherein the arms of at least one of the rotor elements includes a curved end portion, the portion curving about an axis substantially perpendicular to the center axis, wherein the portion curves about 130°.

8. The apparatus of claim 1 further including a generator coupled to the center axis, the generator configured to produce electricity in response to the rotation of the center axis.

9. The apparatus of claim 1 wherein at least one of the rotor elements includes a first side and a second side, wherein the first side presents a greater resistance to the fluid flow as opposed to the second side.

10. The apparatus of claim 1 wherein the second side of the at least one rotor element is produced to be substantially smooth.

11. The apparatus of claim 1 wherein the rotor elements include a vertical hole extending through the rotor elements, and further including a fastener inserted through the vertical hole.

12. The apparatus of claim 11 wherein the fastener compresses the rotor elements together.

13. The apparatus of claim 1 further including a top bracket with a bearing for coupling the top rotor element to the center axis.

14. The apparatus of claim 1 further including a bottom bracket with a bearing for coupling the bottom rotor element to the center axis.

* * * * *